Oct. 4, 1932.  W. O. SMITH  1,880,510
POTATO CUTTER
Filed Sept. 17, 1929    2 Sheets-Sheet 1
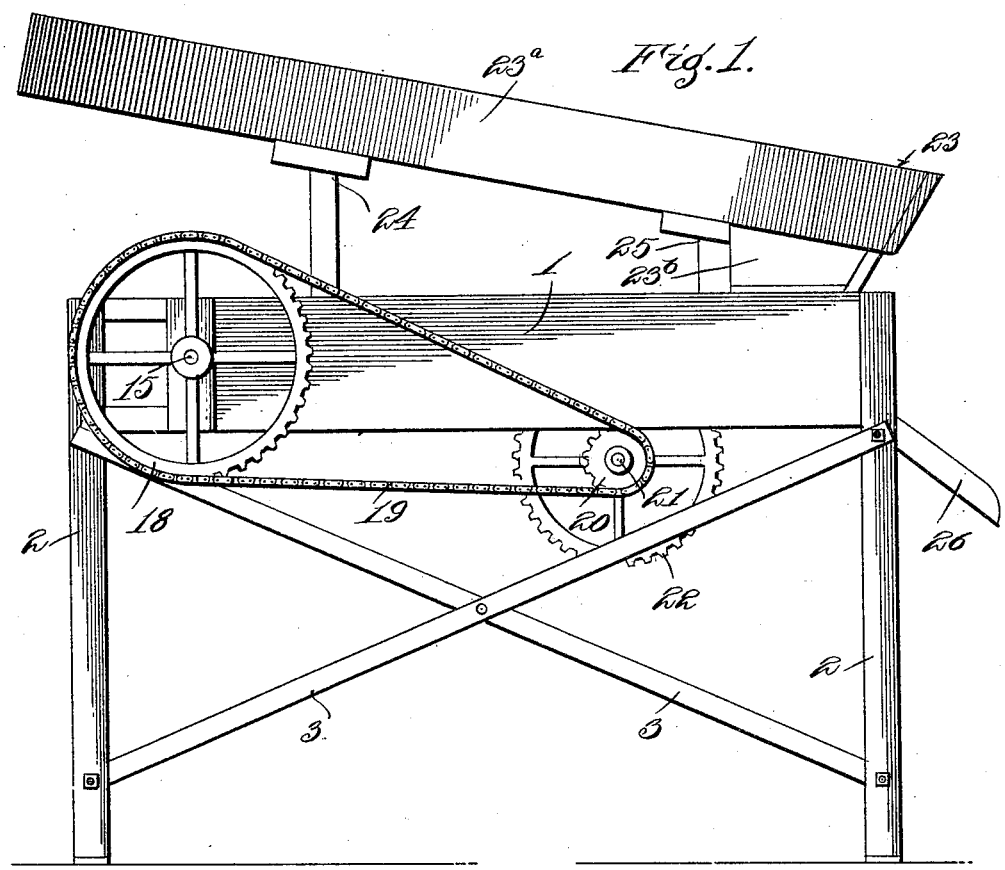
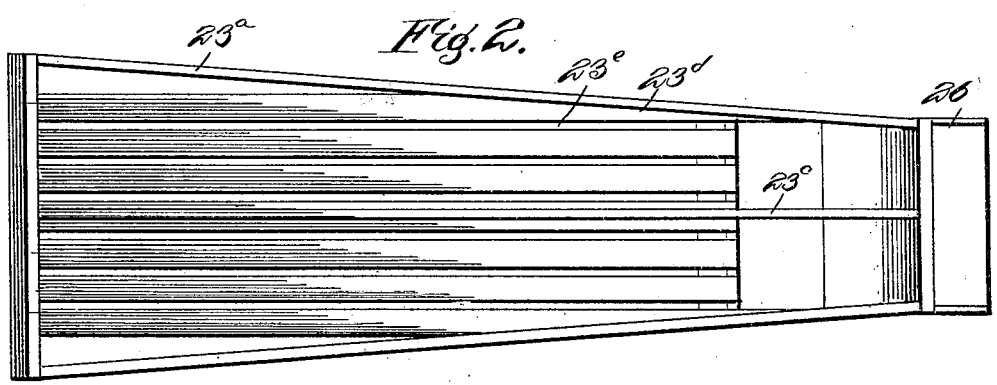
WITNESS
INVENTOR
W. O. Smith.
BY
ATTORNEY Oct. 4, 1932.  W. O. SMITH  1,880,510
POTATO CUTTER
Filed Sept. 17, 1929  2 Sheets-Sheet 2
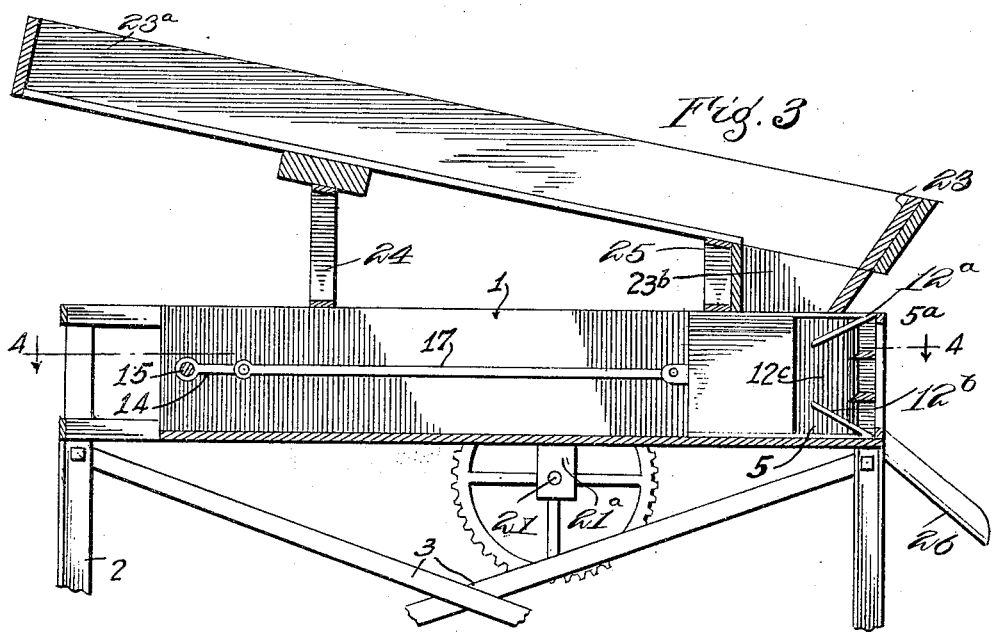
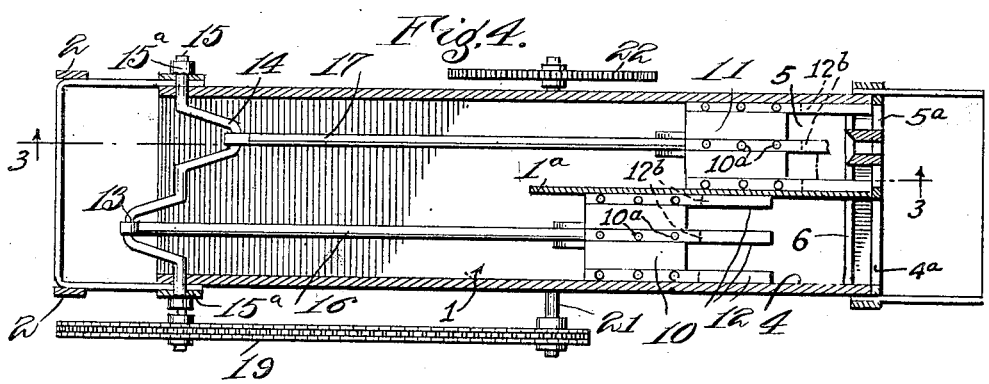
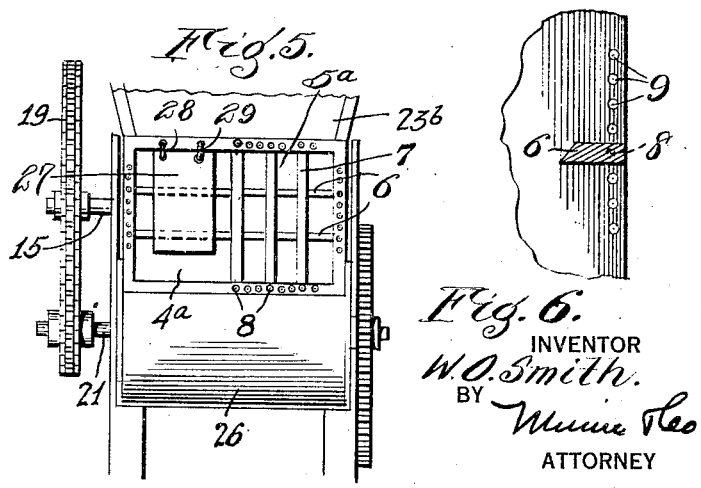
WITNESS
F. H. Taylor
INVENTOR
W. O. Smith.
BY
Munn & Co.
ATTORNEY Patented Oct. 4, 1932

1,880,510

UNITED STATES PATENT OFFICE

WILLIAM O. SMITH, OF KIMBALL, NEBRASKA

POTATO CUTTER

Application filed September 17, 1929. Serial No. 393,280.

My invention relates to improvements in potato cutters, more particularly in potato cutters used for cutting seed potatoes, and it consists in the combinations, constructions and arrangements herein described and claimed.

An object of my invention is to provide a potato cutter adapted for cutting different sized potatoes into two or more pieces according to the desires of the operator.

A further object of my invention is to provide a potato cutter that will permit the operator thereof to discard from the hopper feeding said potato cutter, bad potatoes, dirt and other foreign matter.

A further object of my invention is to provide a device of the type described which is simple in construction, has few parts and is not likely to get out of order easily.

Other objects and advantages will appear in the following specification and the novel features of the invention will be particularly pointed out in the appended claim.

My invention is illustrated in the accompanying drawings forming part of this application in which:

Figure 1 is a front elevational view of my device.

Figure 2 is a top plan view of my device.

Figure 3 is a sectional view on the line 3—3 of Figure 4.

Figure 4 is a sectional view on the line 4—4 of Figure 3.

Figure 5 is an end view with parts broken away.

Figure 6 is a detail view of a portion of the device.

In carrying out my invention, I make use of a horizontal cutting chamber 1 supported by the legs 2 which are braced by the brace rods 3. This cutting chamber is divided by partition 1a into a plurality of cutting chamber sections indicated by numerals 4 and 5. The ends of these cutting chamber sections are open as indicated at 4a and 5a for the purpose of permitting the passage of the cut potatoes forced therethrough by means presently to be described. These open ends are each provided with a plurality of cutting knives, the chamber 4 being shown equipped with horizontal cutting knives 6 while the chamber 5 is equipped with horizontal and vertical cutting knives indicated at 6 and 7. These cutting knives are adjustably mounted on the open ends by means of fastening members 8 adapted to be positioned in any of the apertures 9 provided in said open ends. These knives have their cutting edges disposed inwardly.

For the purpose of forcing potatoes against the knives, I provide the reciprocable plungers 10 and 11. These plungers are equipped with potato guiding means 12 in the form of leaf springs. The guide means 12 are secured to the plungers 10 and 11 by screws, as indicated at 10a and any number of these guides may be employed, although in actual practice it has been found that three of the guides positioned upon the top and bottom sides of the plungers is sufficient. The guides 12 extend forwardly of the plungers a suitable distance and intermediate their ends, the guides are bent as at 12a (see Fig. 3) the rearwardly bent portions 12b diverge inwardly toward but stop short of the plungers 10 and 11. Thus, there is produced a resilient pocket 12c immediately in advance of each plunger. By this construction it will be apparent that during the application of pressure upon the potatoes being cut, direct bruising contact between the potatoes and plungers is obviated as well as providing a ready means for centering the potatoes with the cutting knives. The plungers 10 and 11 are reciprocated in opposite phase by means of the oppositely disposed cranks 13 and 14 by the crank shaft 15 connected thereto by pitman 16 and 17. The crank shaft 15 is rotatably supported in bearings 15a mounted in the walls of the potato cutting chamber. The crank shaft 15 is driven by the chain of reduction gearing comprising sprocket wheel 18 fixedly fastened thereto by any suitable means, the chain 19 which drives said sprocket wheel and is in turn driven by sprocket 20, splined or fixed to the shaft 21 suitably journaled in a bearing 21a which may be mounted beneath the cutting chamber 1 in any suitable manner and by any suitable means and the gear 22 engageable with said shaft 21 and which may be driven by any suitable power means.

For feeding the potato cutting chamber section, I provide the table hopper 23 consisting of the elongated chute 23a and the downwardly projecting portion 23b. This table hopper is provided with partitions 23c dividing the table hopper into sections corresponding to the sections of the potato cutting chamber. The floor of this table hopper is constructed of spaced slats 23d providing slots 23e for the purpose of permitting dirt and other foreign matter to escape therethrough. This table hopper is mounted on top of the potato cutting chamber by supports 24 and 25 inclined at an angle to said potato cutting chamber for the purpose of permitting a gravity feed of the potatoes to said potato cutting chamber. The table hopper as is readily apparent provides an opportunity for the sorting of the potatoes therein before their entry to the cutting chamber.

Fastened to the bottom of the potato cutting chamber at the open ends thereof by any suitable means is a receiving chute 26 adapted to receive the cut potatoes forced through the open end of the potato cutting chamber section by the reciprocating plungers 10 and 11. This chute provides means for depositing the cut potatoes in bags, baskets or other receptacles placed therebelow.

Suspended by flexible means in the open end 4a of chamber 4 is a rectangular plate 27 supported by suitable flexible fastening means 28 and 29 from the top of the potato cutting chamber. This plate which is made of metal or any heavy material is adapted to swing on said flexible support freely. The potatoes engage with this plate in their exit from the cutting chamber and are shunted thereby down on the receiving chute.

From the foregoing description of the various parts of the device, the operation thereof will be readily understood. Potatoes to be cut are placed in the chute, the larger ones in that section of the hopper feeding cutter chamber section 5 and the smaller ones in that section of the hopper feeding cutting chamber 4 as desired. Power is then applied to the gear 22 driving the crank 15 through the reduction gearing comprising gear 20, sprocket chain 19 and the sprocket gear 18. This crank shaft by means of its oppositely disposed cranks 13 and 14 reciprocates the plungers 10 and 11 by means of the pitman 16 and 17. Each plunger on its back stroke permits a quantity of potatoes to fall from the table hopper into the potato cutting chamber. On the forward stroke this quantity of potatoes is forced against the knives 6 and 7 performing the cutting operation, then through the open ends 4a and 5a and into the chute 26. Those portions of the potatoes coming from the upper portions of the cutting chamber 4a being shunted by the plate 27 into said chute. The chute deposits the cut pieces into a suitable receptacle placed therebelow. The plungers reciprocate in opposite phase and being driven by oppositely disposed cranks serve to counter-balance one another, thereby eliminating useless vibration and adding to the length of life of the device.

I claim:

In a potato cutting machine, a potato cutting chamber having knives there-across, reciprocable plungers within said potato cutting chamber adapted to force said potato against said knives, said plunger having potatoes centering means comprising leaf springs extending forwardly of said plungers and bent rearwardly intermediate their lengths forming a resilient pocket for reception of potatoes to be cut.

WILLIAM O. SMITH.